(12) United States Patent
Hagiwara et al.

(10) Patent No.: US 11,074,433 B2
(45) Date of Patent: Jul. 27, 2021

(54) INFORMATION PROCESSING APPARATUS, GENETIC INFORMATION GENERATION METHOD AND PROGRAM

(71) Applicant: NEC CORPORATION, Tokyo (JP)

(72) Inventors: Hisashi Hagiwara, Tokyo (JP); Noritada Yasumoro, Tokyo (JP); Yoshinori Mishina, Tokyo (JP)

(73) Assignee: NEC CORPORATION, Tokyo (JP)

( * ) Notice: Subject to any disclaimer, the term of this patent is extended or adjusted under 35 U.S.C. 154(b) by 108 days.

(21) Appl. No.: 16/468,568

(22) PCT Filed: Dec. 11, 2017

(86) PCT No.: PCT/JP2017/044334
§ 371 (c)(1),
(2) Date: Jun. 11, 2019

(87) PCT Pub. No.: WO2018/110490
PCT Pub. Date: Jun. 21, 2018

(65) Prior Publication Data
US 2019/0303653 A1    Oct. 3, 2019

(30) Foreign Application Priority Data
Dec. 12, 2016    (JP) .............................. JP2016-240559

(51) Int. Cl.
*G06K 9/00* (2006.01)
*G06T 7/00* (2017.01)
(Continued)

(52) U.S. Cl.
CPC ....... *G06K 9/00281* (2013.01); *G06F 16/535* (2019.01); *G06F 16/55* (2019.01);
(Continued)

(58) Field of Classification Search
CPC .. G06K 9/00281; G06K 9/00248; G06T 7/00; G06T 1/00; G06T 7/0012;
(Continued)

(56) References Cited

U.S. PATENT DOCUMENTS 5,121,320 A * 6/1992 Aoki ................ G01N 27/44717
382/129
7,729,864 B2 * 6/2010 Schadt ............... G01N 33/5023
702/19
(Continued)

FOREIGN PATENT DOCUMENTS

CN    103642902 A * 3/2014 ........... C12Q 1/6883
JP    2-107962 A    4/1990
(Continued)

OTHER PUBLICATIONS

Communication dated Oct. 7, 2019 from the European Patent Office in application No. 17881789.6.
(Continued)

*Primary Examiner* — Mahendra R Patel
(74) *Attorney, Agent, or Firm* — Sughrue Mion, PLLC

(57) ABSTRACT

An information processing apparatus comprises an extraction part and a genetic information generation part. The extraction part extracts a phenotypic site(s) representing a genetic phenotype(s) of a living entity from the image. The genetic information generation part generates genetic information of the living entity captured in the image based on the phenotypic site(s) extracted by the extraction part. The image comprises a person image in which a person captured. The genetic information generation part may generate genetic information of the person captured in the person image.

7 Claims, 12 Drawing Sheets

(51) Int. Cl.
    *G06F 16/55*    (2019.01)
    *G06T 1/00*     (2006.01)
    *G06F 16/535*   (2019.01)

(52) U.S. Cl.
    CPC ............ *G06K 9/00248* (2013.01); *G06T 1/00*
    (2013.01); *G06T 7/00* (2013.01); *G06T 7/0012*
    (2013.01); *G06T 2207/30004* (2013.01); *G06T 2207/30201* (2013.01)

(58) Field of Classification Search
    CPC . G06T 2207/30004; G06T 2207/30201; G06F
    16/55; G06F 16/535; G01N 2405/00;
    H01J 49/0409; C12N 2501/115; C12N
    2500/02; G16B 20/00; A61B 17/320068;
    A61B 5/0066; A61B 5/055; A61B
    2218/002
    USPC ......................................................... 382/118
    See application file for complete search history.

(56) References Cited

U.S. PATENT DOCUMENTS

| | | | | |
|---|---|---|---|---|
| 8,965,061 B2* | 2/2015 | Hasebe | ................. | G06T 7/00 |
| | | | | 382/115 |
| 9,092,391 B2* | 7/2015 | Stephan | ................. | G16B 20/00 |
| 9,436,892 B2* | 9/2016 | Hu | ................. | G06K 9/469 |
| 9,552,637 B2* | 1/2017 | McVey | ................. | G06T 7/0012 |
| 2002/0119441 A1* | 8/2002 | Elias | ................. | G01N 33/5091 |
| | | | | 435/4 |
| 2006/0263879 A1* | 11/2006 | Simon Valles | ....... | C12N 5/0606 |
| | | | | 435/366 |
| 2006/0275899 A1* | 12/2006 | Krtolica | ................. | C12N 5/0606 |
| | | | | 435/366 |
| 2011/0081056 A1* | 4/2011 | Salafia | ................. | G06T 7/64 |
| | | | | 382/128 |
| 2011/0188713 A1* | 8/2011 | Chin | ................. | G06F 16/583 |
| | | | | 382/118 |
| 2011/0206246 A1* | 8/2011 | Wolf | ................. | G06N 5/04 |
| | | | | 382/118 |
| 2012/0004894 A1* | 1/2012 | Butler | ................. | G16H 10/60 |
| | | | | 703/11 |
| 2015/0086104 A1* | 3/2015 | Miyamoto | ............ | G06T 7/0012 |
| | | | | 382/133 |
| 2015/0178549 A1* | 6/2015 | Wolf | ................. | G16B 40/00 |
| | | | | 382/118 |
| 2016/0174830 A1* | 6/2016 | Rubin | ................. | A61B 3/102 |
| | | | | 351/206 |
| 2018/0059126 A1* | 3/2018 | Jones | ................. | G01N 3/00 |

FOREIGN PATENT DOCUMENTS

| | | | |
|---|---|---|---|
| JP | 2005-242432 A | | 9/2005 |
| JP | 2005242432 A | * | 9/2005 |
| WO | WO-2004097015 A1 | * | 11/2004 ........... C12Q 1/6837 |

OTHER PUBLICATIONS

Peter Claes et al., "Modeling 3D Facial Shape from DNA", PLOS Genetics, Mar. 20, 2014, pp. 1-15.
International Search Report for PCT/JP2017/044334 dated, Jan. 9, 2018 (PCT/ISA/210).

* cited by examiner

| PHENOTYPIC SITE LIST |
| --- |
| PHENOTYPIC SITES |
| FRONT HAIRLINE |
| EARLOBE |
| ... |

| BIOLOGICAL SAMPLE INFORMATION | |
|---|---|
| PHENOTYPIC SITE(S) | GENETIC PHENOTYPE(S) (DOMINANT/RECESSIVE) |
| FRONT HAIRLINE | WIDOW'S PEAK (DOMINANT) |
| EARLOBE | NON PLUMP EARS (RECESSIVE) |
| ... | ... |

FIG. 11

| PHENOTYPIC SITE LIST | |
|---|---|
| PHENOTYPIC SITES | WEIGHTS |
| FRONT HAIRLINE | 2 |
| EARLOBE | 2 |
| EYES | 1 |
| HAIR | 1 |
| ... | ... |

FIG. 12

| GENETIC PHENOTYPE PROFILE | |
|---|---|
| PHENOTYPIC SITES | GENETIC PHENOTYPES |
| FRONT HAIRLINE | WIDOW'S PEAK |
| EARLOBE | NON PLUMP EARS |
| EYE COLOR | BLUE |
| HAIR COLOR | BLACK |
| ... | ... |

INFORMATION PROCESSING APPARATUS, GENETIC INFORMATION GENERATION METHOD AND PROGRAM

CROSS REFERENCE TO RELATED APPLICATIONS

This application is a National Stage of International Application No. PCT/JP2017/044334 filed Dec. 11, 2017, claiming priority based on Japanese Patent Application No. 2016-240559, filed Dec. 12, 2016, the entire contents thereof are incorporated by reference into the present application.

FIELD

The present invention relates to an information processing apparatus, a genetic information generation method and a program, particularly, an information processing apparatus, a genetic information generation method and a program processing an image etc. in which a person is captured.

BACKGROUND

For example, it is said that so-called widow's peak is a genetic phenotype relating to a configuration of front hairline that is inherited from parents to their children. 20 or more genes relating to the genetic phenotypes have been identified, and a technology for generating a face montage based on biological sample information obtained from a biological sample, such as hair and blood, has been recently developed (Non-Patent Literature (NPL) 1). Such technology is considered as useful for generation of a criminal montage from blood remaining in a criminal scene.

NPL 1: PLOS GENETICS, "Modeling 3D Facial Shape from DNA", Mar. 20, 2014, online, searched on Oct. 4, 2016, internet <URL: http://dx.doi.org/10.1371/journal.pgen.1004224>

SUMMARY

An analysis below was made from an aspect of the present invention. Herein, each disclosure in the prior art document is incorporated into this Description by reference.

In the technology of Non-Patent Literature 1, there is an insufficient case in an aspect of a technology for identifying a person based on a genetic phenotype(s). Particularly, the technology above is insufficient as a technology for narrowing down a group of a large number of persons to a group of a small number of persons.

For example, even if it is desired to search a person similar to a montage from a large number of persons of the general public captured by a security camera, it would be impossible to determine at a glance whether individual person has all genetic phenotypes identical (consistent) with the montage. That is, it is impractical to regard a large number of persons as determination targets, since determination for individual person requires a long time period. Thus, it is thought necessary to develop a tool assisting the person identification based on the genetic phenotype(s).

Accordingly, it is a purpose of the present invention to provide an information processing apparatus, a genetic information generation method and a program that contribute to easy confirmation of genetic information of an object captured in an image.

According to a first aspect of the present invention, there is provided an information processing apparatus, comprising a processor and a memory storing program instructions executable by the processor, wherein the processor is configured to:

extract one or more of phenotypic sites representing one or more genetic phenotypes of a living entity from an image, and generate genetic information of the living entity captured in the image based on the phenotypic sites as extracted.

According to a second aspect of the present invention, there is provided an information processing apparatus, comprising a processor and a memory storing program instructions executable by the processor, wherein the memory is configured to store biological sample information including one or more genetic phenotypes of a biological sample;

the processor is configured to:

individually detect a person among images in which a large number of persons of the general public are captured, whose one or more phenotypic sites are recognizable as representing one or more genetic phenotypes of a biological sample, and extract the phenotypic sites representing the genetic phenotypes from an image of each of the detected person, determine one or more phenotypes represented in the phenotypic sites extracted by the extraction part, compare the determined phenotypes and the genetic phenotypes of the biological sample, to determine whether a person providing the biological sample is identical with the person captured in the person image, and output information of the detected person who has been determined as identical by the identity determination part.

According to a third aspect of the present invention, there is provided a genetic information generation method, comprising:

extracting one or more phenotypic sites representing one or more genetic phenotypes of a living entity from an image; and generating genetic information of the living entity captured in the image based on the phenotypic sites as extracted.

According to a fourth aspect of the present invention, there is provided a non-transitory computer readable recording medium storing therein a program causing a computer to execute processing comprising:

extracting one or more phenotypic sites representing one or more genetic phenotypes of a living entity from an image; and generating genetic information of the living entity captured in the image based on the phenotypic sites as extracted.

Herein, the program may be stored in a storage medium capable of being read out by a computer. The storage medium may be a non-transient medium, such as a semiconductor memory, a hard disk, a magnetic recording medium and an optical recording medium. The present invention may be realized as a computer program product.

According to each aspect of the present invention, there is provided an information processing apparatus, a genetic information generation method and a program which contribute to easy confirmation of genetic information of an object captured in an image.

BRIEF DESCRIPTION OF THE DRAWINGS

FIG. 4 is an exemplary view of a phenotypic site list.

FIG. 8 is an exemplary view of biological sample information.

FIG. 11 is an exemplary view of a phenotypic site list utilized in a third exemplary embodiment.

FIG. 12 is an exemplary view showing a genetic phenotype profile utilized in a fourth exemplary embodiment.

PREFERRED MODES

Preferable embodiments will be explained in detail below with reference to drawings. Herein, symbols in the following description are expediently attached to each element as an explanatory aid for understanding, but not intended to limit of the present invention to an illustrated configuration. Herein, connection lines of a circuit structure in figures comprises bidirectional connections if there is no particular designation. Opposite direction is not excluded even in a case of one way arrow.

Figure 1:
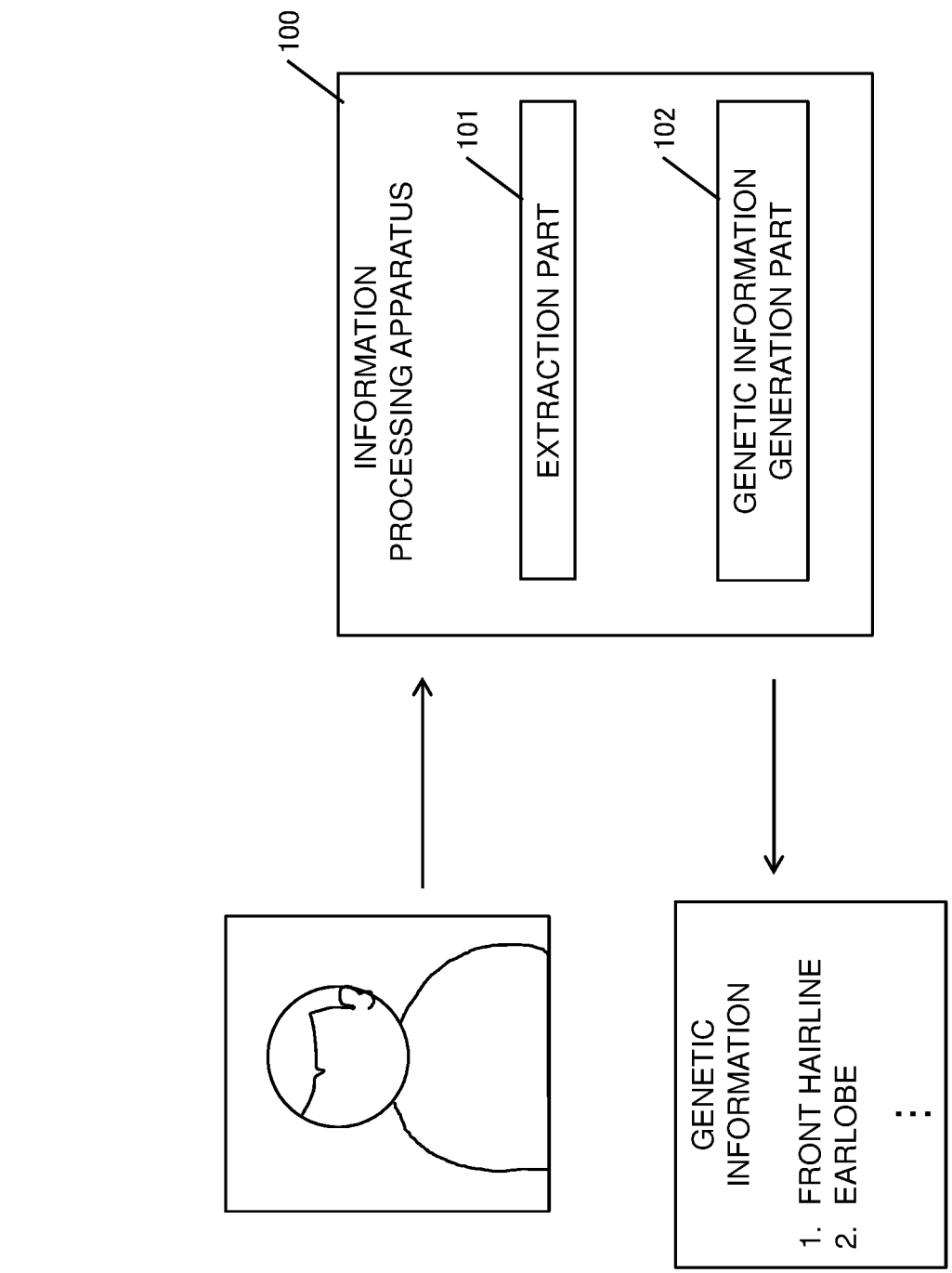
FIG. 1 is an explanatory view for an outline of one exemplary embodiment.

First, an outline of one exemplary embodiment will be explained with reference to FIG. 1. As shown in FIG. 1, an information processing apparatus 100 of the exemplary embodiment comprises an extraction part 101 and a genetic information generation part 102. The extraction part 101 extracts a phenotypic site(s) (phenotypical part) representing a genetic phenotype(s) of a living entity from an image. The genetic information generation part 102 generates genetic information of the living entity captured in the image based on the phenotypic site(s) extracted by the extraction part 101. According to the information processing apparatus 100 of the exemplary embodiment, the genetic information of an object captured in the image may be easily confirmed, thus, for example, a person identification based on the genetic phenotype(s) may be easily carried out.

As a concrete example, a case will be explained, where an operator (determinator) determines identity (consistency) or similarity between a person (determination criterion) providing a biological sample, such as hair and blood, and a person (determination target) captured by a security camera.

The operator has a montage created based on biological sample information obtained from the biological sample and a person image obtained with a security camera and the like. The operator inputs the person image into an information processing apparatus 100. The information processing apparatus 100 previously stores a list (referred to as a phenotypic site list) of phenotypic sites which should be extracted from the person image. The phenotypic site list includes sites (parts) which should be focused by the operator, such as "front hairline", "earlobe" and "hair whorl", but not sites which should be disregarded by the operator, such as "nape".

The information processing apparatus 100 analyzes the person image being input so as to extract the sites listed in the phenotypic site list if they may be recognized in the person image. For example, in an example shown in FIG. 1, "front hairline" and "earlobe" may be recognized in the person image, thus the information processing apparatus 100 extracts sites thereof. However, "hair whorl" cannot be recognized, thus the information processing apparatus 100 does not extract it.

In addition, the information processing apparatus 100 generates and outputs "genetic information" in which name(s) of the extracted phenotypic site(s) is listed. That is, phenotypic site(s) capable of being recognized in the person image is listed in the genetic information. In other words, listed in the genetic information is phenotypic site(s) among the phenotypic sites listed in the phenotypic site list excluding phenotypic site(s) which cannot be recognized in the person image.

The operator compares the montage and the person image while making reference to the genetic information so as to visually determine identity (consistency) or similarity between the person (determination criterion) providing the biological sample and the person (determination target) captured by a security camera. At that time, the operator may consider that he should focus on the phenotypic site(s) which is listed in the genetic information, such as "front hairline", and may disregard the phenotypic site(s) which are not listed in the genetic information, such as "hair whorl". That is, the operator may decrease labor for determination as to which phenotypic site(s) may be utilized for identification of the person captured in the image.

A specific exemplary embodiment will be explained in more detail making reference to the drawings. Herein, in each exemplary embodiment, the same reference numeral is attached to the same component and explanation thereof is omitted. In addition, connection lines between blocks in each figure comprise both of bidirection and single direction. One way arrow schematically indicates flow of main signal (data), but not excluding bidirection.

First, terms used in the present application will be explained.

"A phenotypic site" refers to a site representing various traits in appearance due to inheritance. "Genetic phenotype or phenotype" refers to a trait, type, physical character represented in the phenotypic site. For example, the genetic phenotype represented in a phenotypic site "front hairline" includes a dominant trait (so-called widow's peak) and a recessive trait (non widow's peak).

Herein, explanation below is based on an assumption that it is under Mendel's law (Mendelian inheritance), and thus explained is a case where the genetic phenotype includes a dominant trait (dominant type) and a recessive trait (recessive type). However, even in a case where Mendel's law (non-Mendelian inheritance) is not established, it is enough if a genetic phenotype may be identified from appearance. For example, even in a case where incomplete dominance appears, it is applicable if a trait of dominant homologous allele, a trait of recessive homologous allele and a trait of heterozygous allele may be identified from the appearance. In addition, for example, as for a genetic phenotype representing diverse characters due to SNP (single nucleotide polymorphism), it is applicable, if its appearance may be identified based on type of bases.

A "living entity captured in an image" includes a "person", thus the "image" may be replaced with a "person image (person portrait)". However, the "living entity captured in an image" also includes animals and plants, but not limited to the "person". For example, in a case where the "living entity" is "pea plant (bean)", the "phenotypic site" includes "bean (seed)" and "flower" and the "genetic phenotype" includes "wrinkled (or non-wrinkled)" and "red (or white)".

As described in the outline above, "a person captured in a person image" corresponds to a "determination target", and "a person providing a biological sample" corresponds to a "determination criterion (reference)". In addition, "identical (consistent)" refers to that the determination target is identical (consistent) with the determination criterion, and "identity (consistency)" is determined based on whether the genetic phenotype(s) of the determination target is identical (consistent) with the genetic phenotype(s) of the determination criterion.

"Biological sample information" refers to information indicating a genetic phenotype of a person providing a biological sample, for example, information indicating that the genetic phenotype of the person providing the biological sample is "widow's peak", "plump ears", "black eyes" and "black hair".

"Genetic information" refers to information of the living entity captured in the image, particularly, information obtained by the information processing apparatus 100, and includes a phenotypic site(s) capable of being extracted from an image, a genetic phenotype(s) of a living entity captured in an image (i.e. determination target), and/or identification determination result.

First Exemplary Embodiment

An information processing apparatus 10 of a first exemplary embodiment will be explained making reference to the drawings.

[Hardware Configuration]

Figure 2:
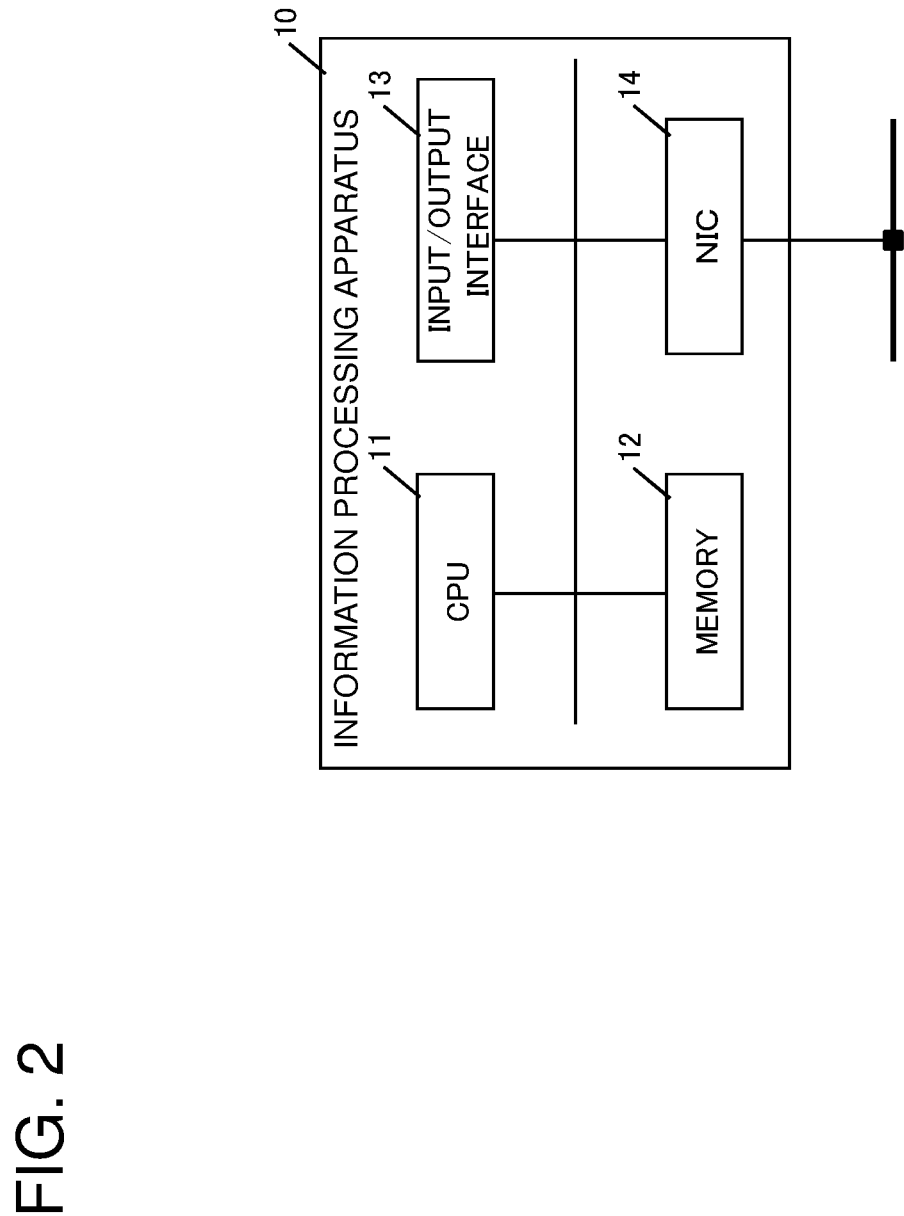
FIG. 2 is an exemplary view showing a hardware configuration of an information processing apparatus of a first exemplary embodiment.

First, a hardware configuration of the information processing apparatus 10 of the first exemplary embodiment will be explained. FIG. 2 is a block diagram showing the hardware configuration of the information processing apparatus 10 of the first exemplary embodiment.

The information processing apparatus 10 is a so-called computer, and has a configuration, for example, shown in FIG. 2. The information processing apparatus 10 is, for example, comprises a CPU (Central Processing Unit) 11, a memory 12, an input/output interface 13, a NIC (Network Interface Card) 14 as a communication means, etc., which are mutually connected with an inner bus.

Herein, the configuration shown in FIG. 2 is not intended to limit the hardware configuration of the information processing apparatus 10. The information processing apparatus 10 may comprise a hardware which is not indicated, and may not comprise NIC 14 and the like, if unnecessary. In addition, the number of CPU 11 etc. mounted on the information processing apparatus 10 is not intended to limit to the example shown in FIG. 3, thus, for example, a plurality of CPUs 11 may be mounted on the information processing apparatus 10.

The memory 12 comprises a RAM (Random Access Memory), a ROM (Read Only Memory), and an auxiliary storage apparatus (such as a hard disk).

The input/output interface 13 comprises a means to be an interface for a display apparatus and an input apparatus, not shown. The display apparatus comprises, for example, a liquid crystal display etc. The input apparatus comprises an apparatus receiving user operation, such as, for example, a keyboard and a mouse. In addition, the input apparatus comprises an external storage apparatus, such as an USB (Universal Serial Bus) memory.

Functions of the information processing apparatus 10 are realized as a variety of processing modules described below. The processing modules are realized in a manner that, for example, the CPU 11 executes programs stored in the memory 12. In addition, such programs may be updated by download via a network or with a storage medium storing programs. Furthermore, the processing modules may be realized with semiconductor chips. That is, a means executing functions of the processing modules with a hardware, and/or, a software may be applied.

Next, processing configurations (processing modules) in each apparatus will be explained.

[Processing Configuration]

Figure 3:
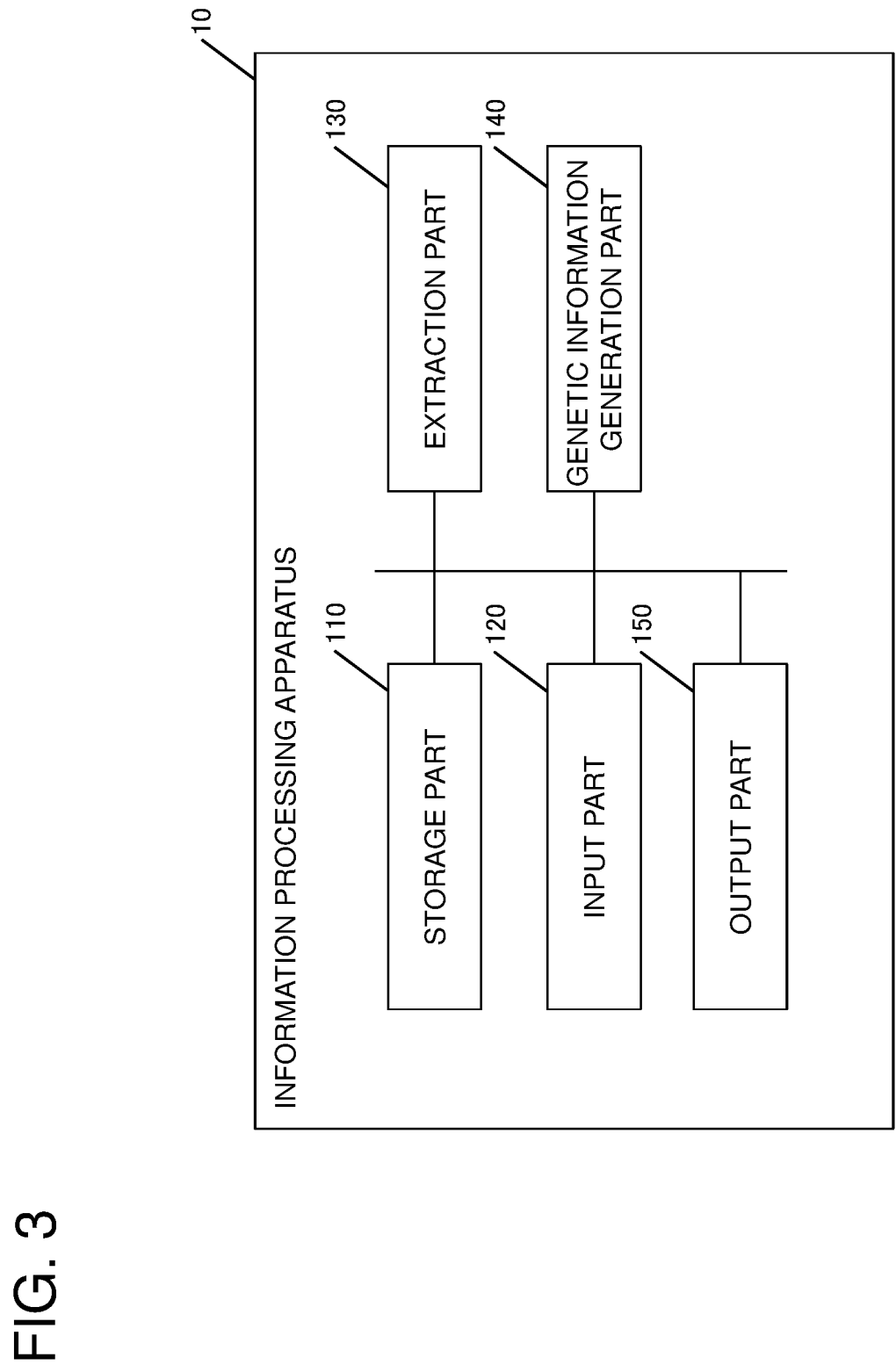
FIG. 3 is an exemplary view showing a processing configuration of the information processing apparatus of the first exemplary embodiment.

FIG. 3 is an exemplary view showing a processing configuration of the information processing apparatus 10 of the first exemplary embodiment. As shown in FIG. 3, the information processing apparatus 10 comprises a storage part 110, an input part 120, an extraction part 130, a genetic information generation part 140 and an output part 150.

The storage part 110 comprises RAM etc. as the memory 12 and stores information required for operation by the information processing apparatus 10, and the like. In addition, the storage part 110 stores the phenotypic site list above and information for extraction of the phenotypic site(s) by image processing, and the like.

The input part 120 is a means for input the person image. The input part 120 functions as an input interface for the person image, etc. Herein, the person image refers to, for example, an image in which a person captured by a security camera and a monitor camera, and is input into the information processing apparatus 10 with an information storage medium, such as an USB memory, or via network.

The extraction part 130 is a means for extracting a phenotypic site(s) representing a genetic phenotype(s) from an image input via the input part 120. The extraction part 130 executes image processing on the person image so as to attempt extraction of the phenotypic site(s) described in a phenotypic site list.

FIG. 4 is an exemplary view of a phenotypic site list including phenotypic sites which should be extracted by the extraction part 130. Referring to FIG. 4, the extraction part 130 attempts to extract at least "front hairline", "earlobe" from a person image. The extraction part 130 stores information into the storage part 110, whether each phenotypic site described in the phenotypic site list is succeeded to be extracted.

Herein, various methods may be applied to extraction process for the phenotypic site(s) by the extraction part 130. For example, the extraction part 130 executes image processing on the person image so as to extract the phenotypic site(s) described in the phenotypic site list. More specifically, the extraction part 130 compares a contour line of a general face stored in the storage part 110 with a contour line of a face of the person captured in the person image so as to extract a face region. After that, the extraction part 130 executes a process, such as respectively determining success or not in extraction of the pattern of the phenotypic sites described in the phenotypic site list stored in the storage part 110. Herein, a technology of a reference literature 1 (Tokkai JP2005-242432A) in which a face authentication technology may be applied to the extraction of phenotypic sites by the extraction part 130.

The genetic information generation part 140 generates genetic information of a person captured in a person image based on a phenotypic site(s) which resulted in success of extraction by the extraction part 130. For example, as the genetic information, the genetic information generation part 140 generates information including a name(s) of the phenotypic site(s) (for example, "front hairline") which is determined as capable of being extracted by the extraction part 130 (resulted in success of extraction). The genetic information generation part 140 transmits the generated genetic information to the output part 150.

The output part 150 is a means for outputting the genetic information generated by the genetic information generation part 140 to an external section. For example, the output part 150 may print out the genetic information and display the genetic information on a monitor as image information. Or, the output part 150 may output the genetic information in a manner such that the genetic information is reflected to the person image from which the phenotypic site(s) is extracted. For example, in a case where "front hairline" and "earlobe" are extracted from the person image, the output part 150 may provide the person image with red circle marks surrounding a forehead part and an earlobe part so that the forehead part and the earlobe part are emphasized.

Figure 5:
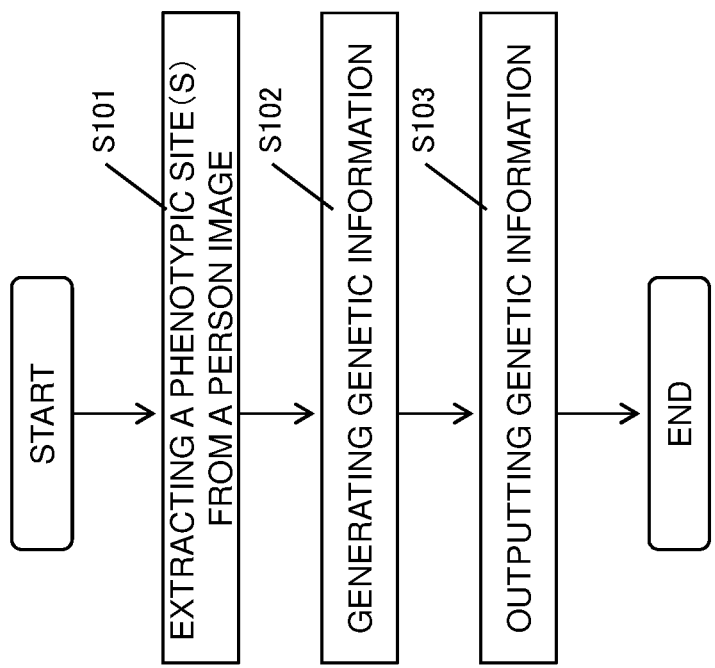
FIG. 5 is a flowchart showing an example of a sequential process by the information processing apparatus of the first exemplary embodiment.

FIG. 5 is a flowchart showing an example of a sequential process by the information processing apparatus of the first exemplary embodiment.

Initially, the information processing apparatus 10 extracts a phenotypic site(s) representing genetic phenotype(s) from a person image (step S101), and then generates genetic information of a person captured in the person image based on the extracted phenotypic site(s) (step S102). After that, the information processing apparatus 10 outputs the generated genetic information in a predetermined manner (step S103).

Figure 6:
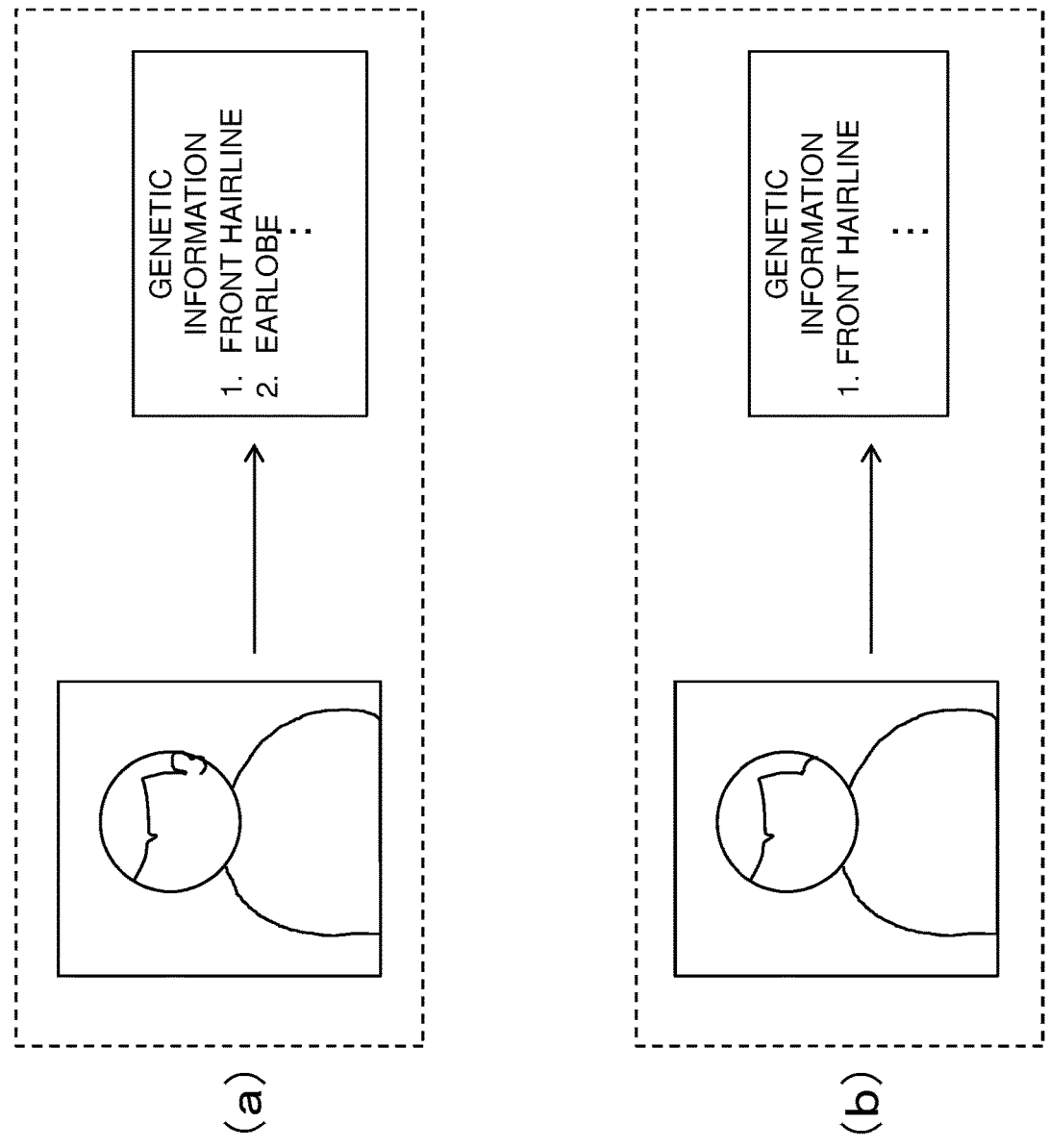
FIGS. 6(a)-(b) are exemplary views showing operation by the information processing apparatus of the first exemplary embodiment.

For example, a case will be discussed, where a person image shown in FIG. 6 (a) is input into the information processing apparatus 10. In this case, "front hairline" and "earlobe" may be extracted from the person image, thus genetic information of the person image shown in FIG. 6 (a) includes names of the 2 phenotypic sites extracted. In addition, another case will be discussed, where a person image shown in FIG. 6 (b) is input into the information processing apparatus 10. In this case, "earlobe" is not captured in the person image, thus the genetic information does not include "earlobe", but includes "front hairline".

Accordingly, the information processing apparatus 10 of the first exemplary embodiment selects a phenotypic site(s) among phenotypic sites described in a phenotypic site list, which is capable of being recognized in a person image, and outputs genetic information in which names of the selected sites are listed. As a result, an operator (determinator) may decrease labor for determination which phenotypic site(s) may be utilized for identification of the person captured in the image, thus may easily identify the person based on the genetic phenotype(s).

Second Exemplary Embodiment

An information processing apparatus 10 of a second exemplary embodiment determines a genetic phenotype(s) represented in a phenotypic site(s) extracted by the extraction part 130 (for example, whether it is widow's peak or not), and then generates genetic information including the determination result.

The second exemplary embodiment will be explained along with the above outline in which FIG. 1 is referred and explained. According to the information processing apparatus 10 of the second exemplary embodiment, an operator may obtain genetic information of a genetic phenotype(s) of a person captured in a person image. When the operator makes reference to such genetic information, the operator may determine identity (consistency) and similarity between a person providing a biological sample and a person captured in a person image by comparing with genetic phenotype(s) of the person providing the biological sample.

Particularly, for a purpose of person identification, if the information processing apparatus 10 of the second exemplary embodiment is used, it is even unnecessary for the operator to generate any montage, since only required is determination whether a genetic phenotype(s) of the person providing the biological sample is identical (consistent) with a genetic phenotype(s) of a person captured in a person image. Herein, the operator is, of course, allowed to compare the montage with the person image in addition to such determination.

Furthermore, in a case where the information processing apparatus 10 determines identity (matching) between the genetic phenotype(s) of the person providing the biological sample and the genetic phenotype(s) of the person captured in the person image, it is also unnecessary for the operator to determine such identity (matching) between the genetic phenotype(s) of the person providing the biological sample and the genetic phenotype(s) of the person captured in the person image. Such exemplary case will be explained below as the second exemplary embodiment.

Figure 7:
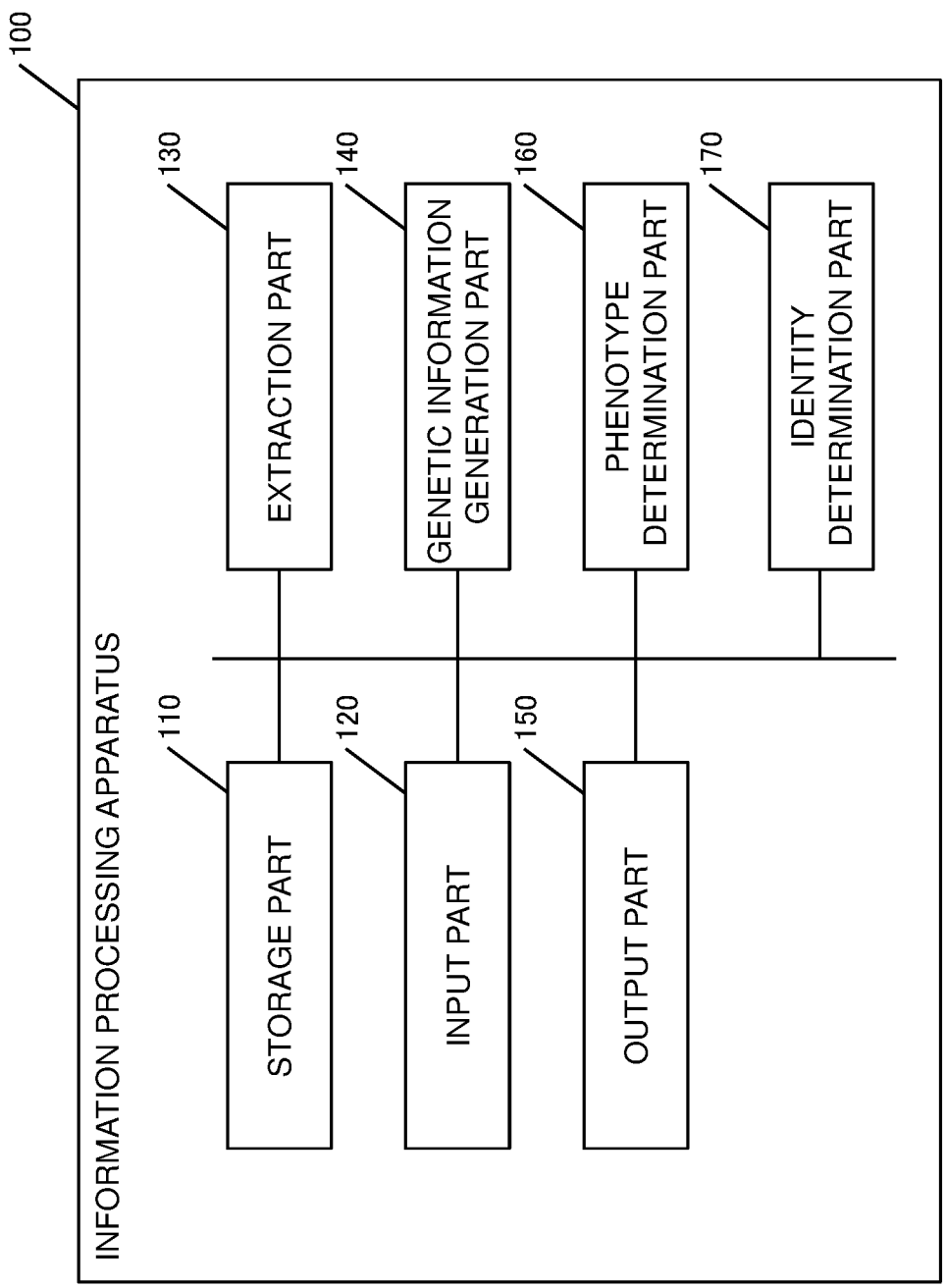
FIG. 7 is an exemplary view showing a processing configuration of an information processing apparatus of a second exemplary embodiment.

As shown in FIG. 7, the information processing apparatus 10 of the second exemplary embodiment further comprises a phenotype determination part 160 and an identity determination part 170, and has difference from the information processing apparatus 10 of the first exemplary embodiment in the following points.

The input part 120 inputs biological sample information including a genetic phenotype(s) of the biological sample. The biological sample information input is stored in the storage part 110. Herein, the biological sample information refers to information including genetic phenotype(s) (dominant/recessive) of the person providing the biological sample (for example, a criminal person who left his blood at a scene of a crime). For example, a name(s) of the phenotypic site(s) is associated with the genetic phenotype(s), such as "widow's peak (dominant)" and "non plump ears (recessive)" in the biological sample information (see FIG. 8).

The phenotype determination part 160 is a means for determining a phenotype(s) represented in the phenotypic site(s) extracted by the extraction part 130.

Specifically, the phenotype determination part 160 determines a region(s) corresponding to the phenotypic site(s) in the person image, which is determined as capable of being extracted by the extraction part 130. After that, the phenotype determination part 160 executes image processing, such as pattern matching, to the phenotypic site(s) extracted by the extraction part 130 so as to determine phenotype(s) represented in the phenotypic site(s). More specifically, the phenotype determination part 160 compares the determined region(s) with previously prepared patterns so as to determine the phenotype(s) represented in the region(s).

For example, the phenotype determination part 160 determines whether a configuration of the phenotypic site "front hairline" is a dominant trait (so-called widow's peak) or a recessive trait (non widow's peak). At that time, the phenotype determination part 160 cuts out the configuration of the front hairline from the person image, and compares the configuration cut out with M-shape pattern previously prepared so as to determine whether it is a widow's peak or not based on matching level therebetween.

Or, the phenotype determination part 160 may determine the dominant/recessive type of the genetic phenotype(s) with a learning model due to machine learning. Specifically, the learning model is constructed with training data of a large number of sample images in which a forehead part is captured and resultant information of determination whether a configuration of front hairline in each image is widow's peak or not. The phenotype determination part 160 may input an image from the person image in which front hairline is captured into the learning model so as to obtain a determination result (whether it is widow's peak or not).

The identity determination part 170 is a means for determining whether the person providing the biological sample is identical with the person captured in the person image by comparing the biological sample information and the determination result by the phenotype determination part 160.

Concretely, the identity determination part 170 reads out the biological sample information from the storage part 110, and compares a genetic phenotype(s) included in the biological sample information and the determination result achieved by the phenotype determination part 160. In addition, in a case where the determination result of all of the genetic phenotype(s) is identical (consistent) with each phenotype included in biological sample information, the identity determination part 170 determines that a person providing the biological sample information is identical with the person captured in the person image (that there is a high possibility that both persons are identical). For example, arguendo that it is at least obtained from a person image that the configuration of "front hairline" is "widow's peak" and the configuration of "earlobe" is "non plump ears", in an example shown in FIG. 8, it is determined that a person providing the biological sample information shown in FIG. 8 is identical with the person captured in the person image.

Or, the identity determination part 170 may execute threshold processing on the number of identity (consistency) between genetic phenotype(s) obtained from the biological sample information and the person image so as to determine identity (consistency) between the persons. Furthermore, the identity determination part 170 may calculate reliability (probability) of the person identification based on the number of identical (consistent) items between the genetic phenotypes.

Figure 9:
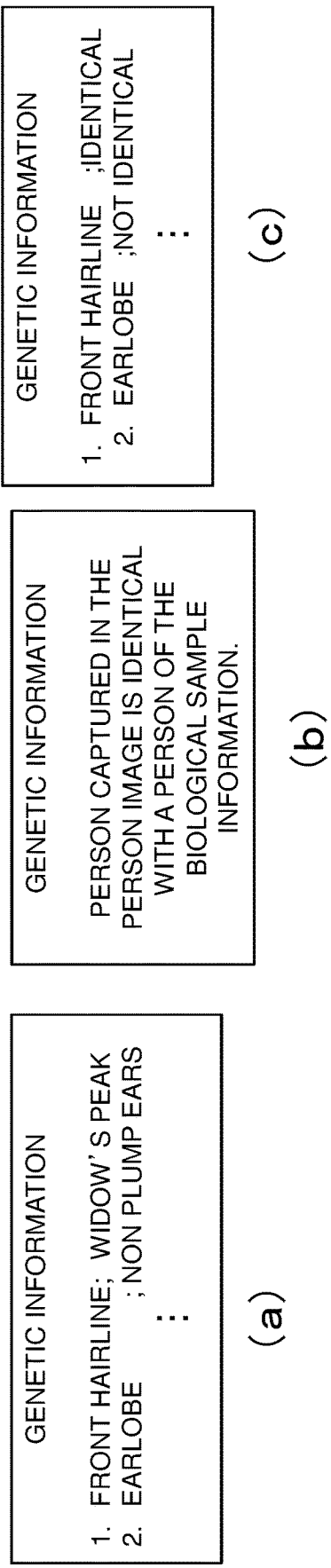
FIGS. 9(a)-(c) are exemplary views showing operation by the information processing apparatus of the second exemplary embodiment.

The genetic information generation part 140 generates genetic information including determination results by the phenotype determination part 160 and the identity determination part 170. For example, as the genetic information, the genetic information generation part 140 may generate information in which a name(s) of the phenotypic site(s) which is determined as capable of being extracted by the extraction part 130 is associated with its dominant/recessive type (the determination result by the phenotype determination part 160) (see FIG. 9 (*a*)). Or, as the genetic information, the genetic information generation part 140 may generate information indicating that the person providing the biological sample is identical, or not identical, with the person captured in the person image (see FIG. 9 (*b*)). Furthermore, as the genetic information, the genetic information generation part 140 may generate information including determination result by the two determination parts. Or, as the genetic information, the genetic information generation part 140 may generate information indicating which genetic phenotype(s) is identical (consistent) and which genetic phenotype(s) is not identical (consistent) between the persons of the biological sample and the person image (see FIG. 9 (*c*)). The generated genetic information is output to external section via the output part 150.

Figure 10:
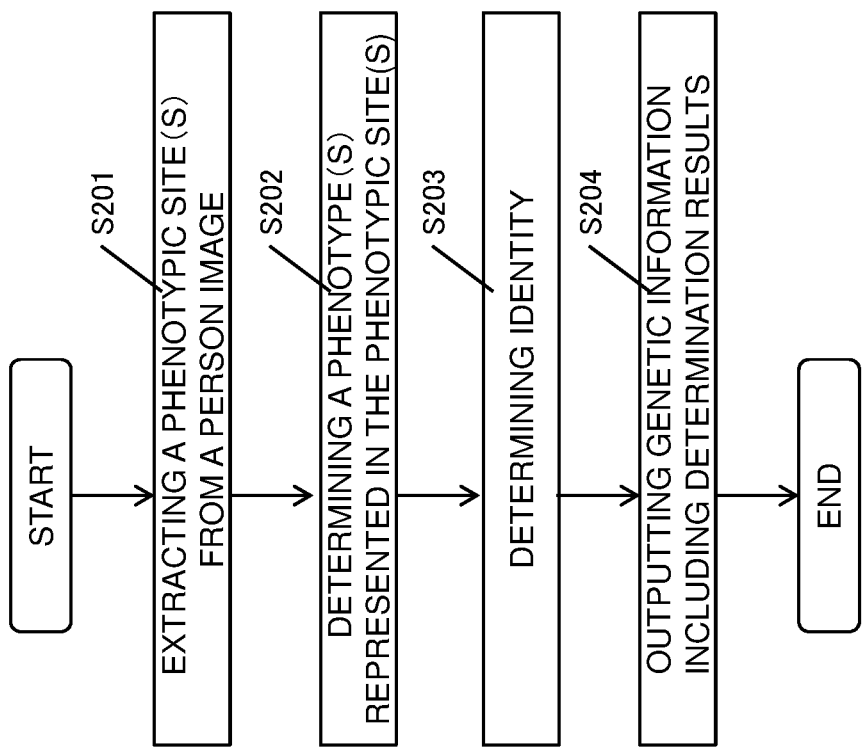
FIG. 10 is a flowchart showing an example of a sequential process by the information processing apparatus of the second exemplary embodiment.

FIG. 10 is a flowchart showing an example of a sequential process by the information processing apparatus of the second exemplary embodiment. The information processing apparatus 10 inputs a person image, and then extracts a phenotypic site(s) representing genetic phenotype(s) from the person image (step S201). In addition, the information processing apparatus 10 determines a phenotype(s) represented in the extracted phenotypic site(s) (step S202). In addition, the information processing apparatus 100 determines whether the person providing the biological sample is identical (consistent) with the person captured in the person image (step S203). After that, the genetic information including determination results is output (step S204).

Accordingly, the information processing apparatus 10 of the second exemplary embodiment generates the genetic information based on the biological sample information input into the information processing apparatus 10, thus the person identification based on the genetic phenotype(s) may be carried out more easily.

Third Exemplary Embodiment

There is a lot of cases where, for example, appearance of a genetic phenotype(s), such as eye color and hair color, has been changed with color contact lenses and hair coloring. As to such genetic phenotype(s) and such phenotypic site(s), it is considered as effective to reduce their weights in the person identification. Therefore, a case will be explained as a third exemplary embodiment, where weights are applied to the phenotypic sites.

If specifically explained, an information processing apparatus 10 of the third exemplary embodiment is different from the information processing apparatus 10 of the second exemplary embodiment in the following points.

A phenotypic site list which has been previously stored in the storage part 110 includes information in which names of the genetic phenotypes and weights applied to the phenotypic sites are associated (see FIG. 11). As to the design of the weights of the genetic phenotypes, a lower (light) weight is basically applied to a phenotypic site having a high likelihood to be changed. On the other hand, a higher (heavy) weight is applied to a phenotypic site having a low likelihood to be changed in appearance. The setting (design) of the weight may be unchangeable. However, the weights of the phenotypic sites may be updated at desired timing along with development in the above mentioned montage generation technology and may be pertinently changed due to a character of a group of determination targets and the genetic phenotype(s) of the biological sample. Therefore, it is preferable that the weights in the phenotypic site list as shown in FIG. 11 are pertinently updated. That is, it is preferable that the weights in the phenotypic site list stored in the storage part 110 (weights applied to each of the phenotypic sites) is configured as changeable.

The identity determination part 170 determines whether the person providing the biological sample information is identical with the person captured in the person image with the weights applied to each of the phenotypic sites. If explained with a specific example, the identity determination part 170 adds up the weights of the phenotypic sites which is identical between the biological sample information and the person captured in the person image, and compares the sum with a predetermined weight threshold. In addition, in a case where the sum of the weights is the weight threshold or more, the identity determination part 170 determines that the person providing the biological sample information is identical (consistent) with the person captured in the person image.

The genetic information generation part 140 may regard the sum of the weights calculated by the identity determination part 170 as a score (reliability) for the person identification, and add the sum to the genetic information. The genetic information is output to external section via the output part 150.

The genetic information generation part 140 may output only the value of the sum of the weights applied to the genetic phenotypes without determining identity (consistency) between the genetic phenotype(s) of the biological sample and the genetic phenotype(s) of the person captured in the person image (without determining person identity). The value of the sum of the weights is regarded by an operator as a degree of identity (consistency) between he person providing the biological sample and the person captured in the person image.

Or, the weights may have a relation with the genetic phenotypes. For example, a lower weight is applied in a case where the configuration of front hairline has a significant difference from the M-shape pattern, and a higher weight is applied in a case where the configuration is extremely similar to the M-shape pattern. Thereby, in a case where the widow's peak of the person captured in the person image is significant, the genetic phenotype relating to the configuration of hairline is emphasized (i.e. given more weight) rather than the other genetic phenotypes, resulting in improvement in accuracy in the person identification.

Accordingly, the information processing apparatus 10 of the third exemplary embodiment determines the identity (consistency) while emphasizing an effective phenotypic site(s) or genetic phenotype(s), thus accuracy in the determination is improved.

Fourth Exemplary Embodiment

Herein, if simply said, the above exemplary embodiments would be a technology for generating a profile involving the genetic phenotype(s) of the person captured in the person image (determination target) and determining identity (consistency) between the person and the person providing the biological sample (determination criterion). The present application is not limited to the above exemplary embodiments. For example, the present application may be applied to a technology for searching a person having a genetic phenotype profile of the person providing the biological sample from an image or movie in which a large number of persons of the general public are captured.

As specifically explained, in a configuration shown in FIG. 7, the storage part 110 stores, for example, an image or movie in which a large number of unidentified persons are captured. Or, the input part 120 may access to a server, such as an external database server, storing an image in which a plurality of persons are captured, so as to obtain the image.

The input part 120 inputs a list of genetic phenotypes including their phenotypic sites as a genetic phenotype profile of a person providing a biological sample (see FIG. 12). FIG. 12 indicates that the search target is a person having physical characters of "widow's peak", "non plump ears", "blue eyes" and "black hair".

In order to realize the person search mentioned above, the extraction part 130 determines individual person(s) from an image in which a large number of persons are captured, whose phenotypic site(s) may be recognized as representing genetic phenotype(s) of a biological sample, and extracts the phenotypic site(s) representing the genetic phenotype(s) from the image of the determined person. For example, in an example shown in FIG. 12, the extraction part 130 determines persons whose "front hairline", "earlobe", "eye color" and "hair color" may be recognized, and extracts phenotypic sites thereof.

The phenotype determination part 160 determines phenotypes represented in the phenotypic sites determined by the extraction part 130. In addition, the identity determination part 170 compares the determination result by the phenotype determination part 160 and the genetic phenotypes of the biological sample so as to determine whether or not the person providing the biological sample is identical with the person captured in the person image. The output part 150 outputs information relating to the person(s) determined as consistent (identical) with the profile genetic phenotypes by the identity determination part 170 (for example, information for identifying image stored in the storage part 110).

According to the information processing apparatus 10 of the fourth exemplary embodiment, annotation (genetic information) indicating that the person has a specific phenotype profile may be attached to, for example, an image in which a large number of persons are captured and images in which a person passing through a gate is captured. The person identification based on genetic phenotypes may be also carried out easily with such information processing apparatus 10.

The processing configurations of the information processing apparatuses 10 explained in the first to fourth exemplary embodiments are mere examples, but not intended to limit construction of the information processing apparatus. For example, each of functions of the extraction part 130 and the genetic information generation part 140 may be realized by another apparatus.

Although the processing target (object) is mainly a person image in which a person is captured in the exemplary embodiments above, the information processing apparatuses in each of the exemplary embodiments may be applied also as an apparatus for extracting a phenotypic site(s) representing a genetic phenotype(s) in a living entity, but not only a person. For example, it may be thought to be applied as an application, such as an educational application teaching that "presence or absence of wrinkles" or "color of bean (seed)" are genetic phenotypes from an image in which a pea plant (bean) is captured. In addition, it may be thought to be applied as a recreation tool which extracts and displays a genetic phenotype(s) in a face image.

In the exemplary embodiments above, a plurality of persons may be captured in the person image. That is, the extraction part 130 extracts individual phenotypic site of the plurality of persons in one or a plurality of person images, and the genetic information generation part 140 generates genetic information of individual person.

A computer may be caused to function as a genetic information generation apparatus for generating information involving the genetic information by installing a computer program as mentioned above into a storage part of the computer. In addition, the computer may execute the computer program so as to execute a genetic information generation method.

A part or entire of the exemplary embodiments may be described as the following modes, but not limited thereto.

[Mode 1]

An information processing apparatus of the first aspect above.

[Mode 2]

The information processing apparatus according to Mode 1, wherein the image is a person image in which a person is captured, and the genetic information generation part generates genetic information of the person captured in the person image.

[Mode 3]

The information processing apparatus according to Mode 2, wherein the information processing apparatus further comprises a phenotype determination part that determines a phenotype(s) of [represented by] the phenotypic site(s) extracted by the extraction part, and the genetic information generation part generates the genetic information including the phenotype(s) determined by the phenotype determination part.

[Mode 4]

The information processing apparatus according to Mode 3, wherein the information processing apparatus further comprises an identity determination part that compares a biological sample information including dominant/recessive type of the genetic phenotype(s) of a biological sample and a determination result by the phenotype determination part so as to determine whether a person providing the biological sample is identical with the person captured in the person image, and the genetic information generation part generates the genetic information including a determination result by the identity determination part.

[Mode 5]

The information processing apparatus according to Mode 3 or 4, wherein the information processing apparatus further comprises a storage part which stores a phenotypic site list in which the phenotypic sites to be extracted are described, and the extraction part executes image processing on the person image so as to extract the phenotypic site(s) described in the phenotypic site list.

[Mode 6]

The information processing apparatus according to any one of Modes 3 to 5, wherein the phenotype determination part executes the image processing to the phenotypic site(s) extracted by the extraction part by pattern matching so as to determine the phenotype represented in the phenotypic site(s).

[Mode 7]

The information processing apparatus according to Mode 4, wherein the identity determination part determines whether the person providing the biological sample is identical with a person captured in the person image using weights applied to each of the phenotypic site(s) or each of the genetic phenotype(s).

[Mode 8]

The information processing apparatus according to Mode 7, wherein the weights applied to each of the phenotypic site(s) or each of the genetic phenotype(s) are configured to be changeable.

[Mode 9]

An information processing apparatus of the second aspect above.

[Mode 10]

A genetic information generation method of the third aspect above.

[Mode 11]

A program of the fourth aspect above.

Herein, Mode 9 to Mode 11 may be developed to Mode 2 to Mode 8 like as Mode 1.

Herein, disclosure of the Non Patent Literature above is incorporated by reference into the present application. The exemplary embodiments and examples may be modified or adjusted within a scope of the entire disclosure of the present invention (including Claims) and based on the basic technical concept thereof. In addition, various combinations, selections, or non-selections may be applied to various disclosed elements (including each element of each Claim, each element of each exemplary embodiment or example, each element in each Figure, etc.). That is, the present invention, of course, includes a variety of modifications and corrections which may be made by a person skilled in the art according to entire disclosure, technical concept including Claims.

REFERENCE SIGNS LIST

10, 100 information processing apparatus
11 CPU (Central Processing Unit)
12 memory
13 input/output interface
14 NIC (Network Interface Card)
101 extraction part
102 genetic information generation part
110 storage part
120 input part
130 extraction part
140 genetic information generation part
150 output part
160 phenotype determination part
170 identity determination part

The invention claimed is:

1. An information processing apparatus, comprising a processor and a memory storing program instructions executable by the processor, wherein the processor is configured to:

extract one or more of phenotypic sites representing one or more genetic phenotypes of a person from a person image, determine one or more phenotypes represented in the phenotypic sites as extracted, compare a biological sample information including the genetic phenotypes of a biological sample and a determination result so as to determine whether a person providing the biological sample is identical with the person captured in the person image, and generate the genetic information including a determination result indicating whether the person providing the biological sample is identical with the person captured in the person image, or not.

2. The information processing apparatus according to claim 1, wherein the memory is configured to store a phenotypic site list in which the phenotypic sites to be extracted are described, and the processor is configured to execute image processing on the person image to extract the phenotypic sites described in the phenotypic site list.

3. The information processing apparatus according to claim 1, wherein the processor is configured to execute the image processing to the phenotypic sites extracted by pattern matching so as to determine the phenotype represented in the phenotypic sites.

4. The information processing apparatus according to claim 1, wherein the processor is configured to determine whether a person providing the biological sample is identical with a person captured in the person image using weights applied to each of the phenotypic sites or each of the genetic phenotypes.

5. The information processing apparatus according to claim 4, wherein the weights applied to each of the phenotypic sites or each of the genetic phenotypes are configured to be changeable.

6. A genetic information generation method, comprising:

extracting one or more phenotypic sites representing one or more genetic phenotypes of a person from a person image;

determining one or more phenotypes represented in the phenotypic sites as extracted;

comparing a biological sample information including the genetic phenotypes of a biological sample and a determination result so as to determine whether a person providing the biological sample is identical with the person captured in the person image; and generating the genetic information including a determination result indicating whether the person providing the biological sample is identical with the person captured in the person image, or not.

7. A non-transitory computer readable recording medium storing therein a program causing a computer to execute processing comprising:

extracting one or more phenotypic sites representing one or more genetic phenotypes of a person from a person image;

determining one or more phenotypes represented in the phenotypic sites as extracted;

comparing a biological sample information including the genetic phenotypes of a biological sample and a determination result so as to determine whether a person providing the biological sample is identical with the person captured in the person image; and generating the genetic information including a determination result indicating whether the person providing the biological sample is identical with the person captured in the person image, or not.

\* \* \* \* \*